May 23, 1950 M. MORRISON 2,509,012

MAGNETIC DISK RECORD

Filed Oct. 18, 1945

Inventor

Montford Morrison

Patented May 23, 1950 2,509,012

UNITED STATES PATENT OFFICE 2,509,012

MAGNETIC DISK RECORD

Montford Morrison, Upper Montclair, N. J.

Application October 18, 1945, Serial No. 623,110

2 Claims. (Cl. 274—41.4)

Figure 1:
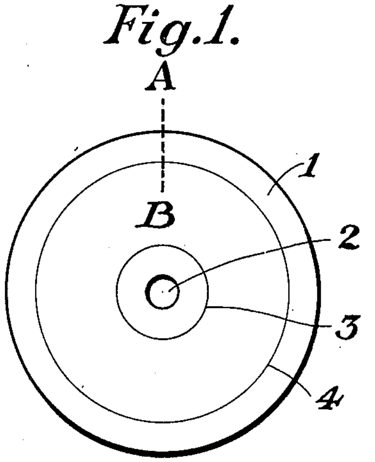

The present invention relates to records and record blanks for sound recording; in particular it relates to sound tracks for magnetic recording and reproducing, and specifically it relates to such tracks having fixed geometrical paths, such as plane spirals and cylindrical helices.

Definitions of some of the terms as used herein, will be given to clearly define the scope of the invention. The term "record" is employed in the several commonly used senses to mean; the integral structure of the "record blank" before recording and to this structure after recording, as well as to mean the physical constituents of the recording proper, whichever the sense may indicate. For conciseness, the term "wire" is used in a broad sense to mean, an elongated piece of metal, independently of what the latitudinal cross section of the metal may be, that is, wire is used to include "ribbon" and elongated forms having other cross sections.

An object of the invention is to provide a support for wire sound tracks to fix the track in an improved form for handling and operating.

Another object is to provide wire sound tracks in fixed forms which are adapted to driving and feeding mechanisms conventionally employed in the art, such as mechanisms used with disc records and mechanism used with cylinder records.

Another object is to provide a record for magnetic recording in the form of discs and hollow cylinders which have light, practical weights comparable with similar forms of records made entirely of wax or entirely of other so-called plastic material.

Another object is to provide a record for circular-cross-section-wire recording which may be magnetized in any suitable direction, without introducing distortion by axial twisting of the wire, as is commonly the case with loose wire recording.

In the prior art, one of the forms of records for magnetic recording has been in the form of loose steel wire wound at random on a reel, to be unwound for recording or reproducing and then rewound for repeated use.

Where very lengthy records are to be made over long periods of time and where the record over this long period of time is to be preserved and referred to as a whole, these forms of records are satisfactory and practical, but where short records are to be made having a duration of the order of that possessed by common disc or cylinder type records, this form of loose reeled wire becomes impractical. Further, loose reeled wire requires special record driving mechanism which is entirely different from the conventional forms employed with discs and cylinders.

Magnetic recording in wire tracks possesses an outstanding improvement over the conventional plastic disc and cylinder records, in that the wire record has a playback life greatly in excess of that obtained from plastic sound tracks.

In the prior art there have been attempts to attain the long-life playback qualities of magnetic recording and preserve the practical forms of the records by the use of solid discs and hollow solid-shell cylinders. These forms of records, however, have too many outstanding disadvantages to be practical. In the first place, it is economically impossible to produce in plates and tubes, a uniformity of magnetic permeability which is easily acquired in the form of wire, whether the cross section is round, ribbon-like or otherwise. It is well known in the art that magnetic sheet steel varies greatly in permeability, depending upon the particular sheet taken from the gang in which it was rolled, as well as will the permeability of the material vary greatly over a single sheet. These variations apply to any single direction in the sheet and it is known that these variations are further extended by the direction along the sheet in which the permeability is taken. That is, the permeability in the direction of rolling is different from that in a direction transverse to that of rolling.

It is obvious, when a disc is cut from a sheet of magnetic steel, that the permeability of the disc varies with the angular position of the point at which the permeability is taken as well as is it likely to vary at positions radially from the center of the disc. While it may not be impossible to correct this variation in permeability by more careful control of making the steel, by more careful control over the annealing and by cross-rolling the steel or finishing it with a circular rolling operation, such procedure, it is believed, is out of the question economically.

The same reasoning more or less equally applies to cylinders which are cut from extruded or swaged tubes, in which case the direction of maximum permeability is at right-angles to that desired.

Discs and cylinders of suitable thickness for magnetic recording are much heavier than conventional plastic forms and therefore more impractical in handling and shipping.

In the present invention the highly constant and dependable permeability characteristics of wire for magnetic recording is employed in forms similar to and comparable with plastic discs and cylinders, thereby attaining in a single structure, the desirable features of magnetic wire recording and plastic forms of records, and at the same time, eliminating the undesirable features of both.

The objects of the invention are attained by winding a wire of magnetic material into the form of a plane spiral or into the form of a cylindrical helix and providing a light-weight non-magnetic support for the wire structure to fix it permanently into the form thus wound, resulting in a light-weight disc record or a light-weight cylinder record, similar in form to conventional disc and cylinder records, and therefore usable on disc and cylinder machines with suitable forms of magnetic recording and reproducing heads.

Figure 2:
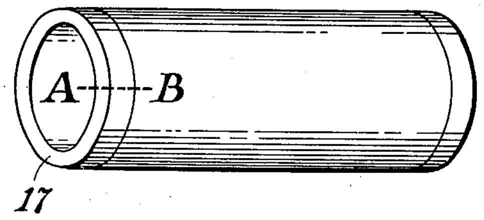
Figure 4:
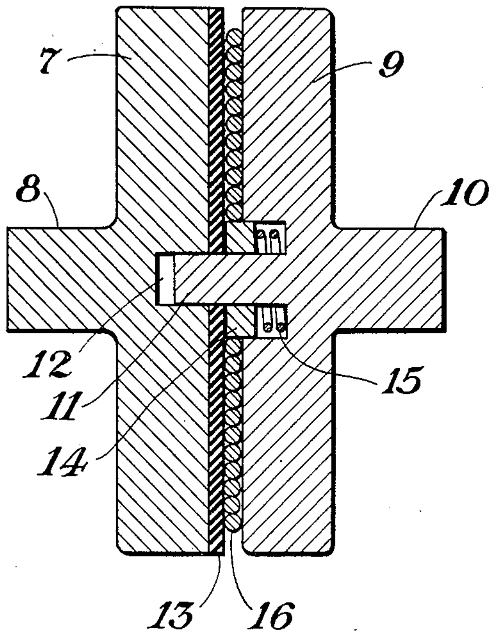
Figure 3:
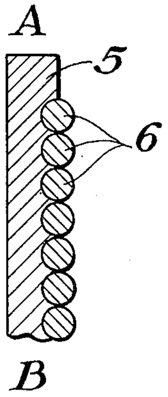
Figure 5:
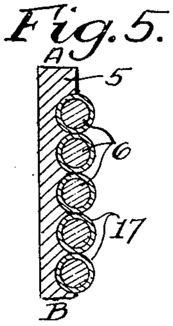

Other and further objects will be pointed out and obvious upon reading the specification, particularly when taken in connection with the drawing in which Fig. 1 represents an embodiment of the invention in the form of a disc; Fig. 2 represents an embodiment of the invention in the form of a hollow cylinder; Figs. 3 and 5 are cross sections taken between A and B in Figs. 1 and 2, and Fig. 4 illustrates one form of fixture which may be employed in producing embodiments of the invention in the form of discs.

Referring to Fig. 1, 1 is a disc of non-magnetic material preferably of a flexible nature suitable for the purpose of supporting the wire hereinafter described. The disc 1 may be of any suitable diameter and thickness, one of the conventional diameters and thicknesses of standard records being suitable. In the present embodiment the employment of a specific material for disc 1 will be given and that is specified to be a so-called rigid sheet of thermoplastic material such as known by the trade-name as Vinylite Resin. This material remains very flat, does not shrink with age and is thermoplastic, a property, the use of which, will be made in the present embodiment of the invention as hereinafter pointed out.

The disc 1 has a centering hole 2 about which it may be revolved and a sound track comprised of wire of magnetic material between the limits of the concentric circles 3 and 4.

The wire sound track between the concentric circles 3 and 4 is wound in the form of a plane spiral composed of wire having a good magnetic permeability. The wire employed may be one of the forms of wire commonly used for sound recording, having any suitable cross section, and specifically in the present embodiment, the wire is specified to be of round cross section, of a stainless steel character and specifically may be a grade known as Allegheny type 420 stainless steel.

Referring to Fig. 3, this is a cross- section taken between A and B in Fig. 1, 5 is a section of the Vinylite Resin disc, and the circles 6 represent cross sections of the plane spiral wire of magnetic material merely bound to or embedded in the material 5.

Depending upon the type of recording employed, the wire which comprises the track represented by the circles 6, may be bare when bound to or embedded in the disc material 5, or the wire may be previously coated by any suitable coating process such as that employed in enameling wire, if desired. In some cases of magnetic recording, it will be allowable to have the wires represented by the circles 6, touch each other in the plane of the spiral formed by them, as shown in Fig. 3, in which case the wire may, of course, be bare. However, in some cases of magnetic recording, it will be found advantageous to have the wires represented by the circles 6, definitely spaced from each other circumferentially in the plane of the spiral formed, as shown in Fig. 5, and a practical method of attaining this spacing structure is to coat the wire previous to binding it to or embedding it in the disc material 5. In Fig. 5, the rings 17 represent the coating of the wires referred to above. Of course, other means of spacing the wires may be employed but this form is given as a practical procedure.

Obviously, since the wire has a fixed form of path, any suitable method of magnetic recording may be applied to the wire and in any suitable direction with reference to the path.

In the case where coated wire is employed and it is desired to remove the coating from the side of the wire opposite to that of the disc material 5, this may be done by any suitable mechanical method such as machining or lapping.

As one practical means of embedding the sound track wire represented by the circles 6 into the disc 5, reference is made to Fig. 4 in which 7 is a heavy flanged member having a shaft extension 8, and 9 is a similar flanged member having a similar shaft extension 10. Flange 9 has a dowel pin extension 11 which fits the center hole 2 of disc 1, and the dowel pin 11 fits closely in a dowel hole 12 which serves to center the flanges 7 and 9 with each other as well as with shafts 8 and 10. 13 represents the disc 1 centered about the dowel pin 11 between the flanges 7 and 9.

A loose sleeve 14 fits on the dowel pin 11, and is held against the disc 13 by a spring 15. The loose sleeve 14 has the diameter of the circle 3 of the disc 1 and serves as a mandrel about which the wire of magnetic material is wound.

The assembly described in Fig. 4 comprises a winding form which may be driven from shafts 8 and 10 in a direction about the axis of the flanges 7 and 9 and thus the wire of magnetic material is wound into the form of a plane spiral, as indicated by the circular section 16, and up to a diameter represented by the circles in Fig. 4. The two ends of magnetic wire material are secured by any suitable means.

The wire, before winding into the form illustrated in Fig. 4, may be either bare or coated for radial spacing, if desired. Obviously other means of spacing the wire may be employed.

The winding form, as described in Fig. 4, complete with a thermoplastic disc 13 and the plane spiral 16, may be then transferred to any suitable means of applying temperature and pressure between the disc 13 and the wire 16 to embed the wire 16 into the disc 13 in a manner equivalent to that illustrated in Fig. 3. This process may be carried out in any suitable thermoplastic press having means for elevating the temperature of the fixtures, or the fixtures may be of non-metallic material and the wire may be heated by one of the conventional induction methods of heating and suitable pressure then applied to embed the wire into the disc to attain a result equivalent to that illustrated in Fig. 3. Obviously, if induction heating is employed for the wire 16, precautions will have to be taken in the selection of material used in the fixture to prevent induction heating from raising the temperature parts not desired to be raised, such as spring 15. These details, however, are common practices known in the art.

Direct heating of the wire by electrical conduction is very satisfactory.

In Fig. 2, 17 is a hollow cylinder of dimensions comparable with those conventionally used in the wax record art but in the present case a specific material for the present embodiment will be that specified for Fig. 1, namely, a hollow cylinder of Vinylite Resin.

Suitable wire of magnetic material may be wound on this cylinder by any suitable means and into the form of a cylindrical helix. If the wire and the thermoplastic tube are heated where contact occurs between these two materials under the winding operation, the wire of magnetic material is embedded into the surface of the cylinder in an equivalent way to that in which it is embedded into disc 1 by the method described, that is, a cross section taken through the disc between A and B will be equivalent to that shown in Fig. 3, as will be understood by those skilled in the art, from the foregoing disclosure.

However, it is to be specifically pointed out that the wires comprising the sound track do not have to be embedded into the material of the disc 1 and the cylinder 17 and they may be, obviously, laid on the surfaces thereof without any embedding action by the employment of a suitable binder between the supporting disc 1 and the supporting cylinder 17 and the wire forming the sound track. So-called solvent binding of the wire to the disc is a very satisfactory method to employ. This comprises an application of solvent to one surface of the disc, which renders the surface highly adhesive; then the wire is applied to the adhesive surface and when the solvent evaporates, the wire is solidly bound to the disc or other support, as is well understood in the art of plastics.

Further and other means may be employed for supporting the plane spiral of magnetic material and the cylindrical helices of magnetic material to fix its form without departing from the spirit of the invention, as set forth in the objects of the invention given herein.

Having described several embodiments of the invention, what is claimed is:

1. The method of producing a sound track for magnetic recording which comprises, drawing a magnetizable metal into the form of a wire suited to magnetic recording, coating said wire with a non-magnetizable material to prevent contact between adjacent convolutions of said wire when wound into the form of a contiguous plane spiral, winding said wire into the form of a contiguous plane spiral, and uniting said spiral with a discal support by adhesion.

2. A sound track for magnetic recording comprising, a preformed ductile wire of magnetizable metal having a pre-set coating of non-magnetic material thereon, said wire being wound into the form of a contiguous plane spiral, a non-magnetic discal support for said spiral of wire, and adhesive means uniting said spiral of wire with said support.

MONTFORD MORRISON.

REFERENCES CITED

The following references are of record in the file of this patent:

UNITED STATES PATENTS

| Number | Name | Date |
|---|---|---|
| 720,621 | Rosenbaum | Feb. 17, 1903 |
| 822,222 | Poulsen | May 29, 1906 |
| 1,827,051 | Thomas | Oct. 13, 1931 |
| 1,912,887 | Chipman | June 6, 1933 |
| 1,940,274 | Severy | Dec. 19, 1933 |

FOREIGN PATENTS

| Number | Country | Date |
|---|---|---|
| 512,766 | Great Britain | Nov. 30, 1937 |